D. HOWARD.
TOOL HOLDER.
APPLICATION FILED APR. 19, 1912.
1,060,340.
Patented Apr. 29, 1913.
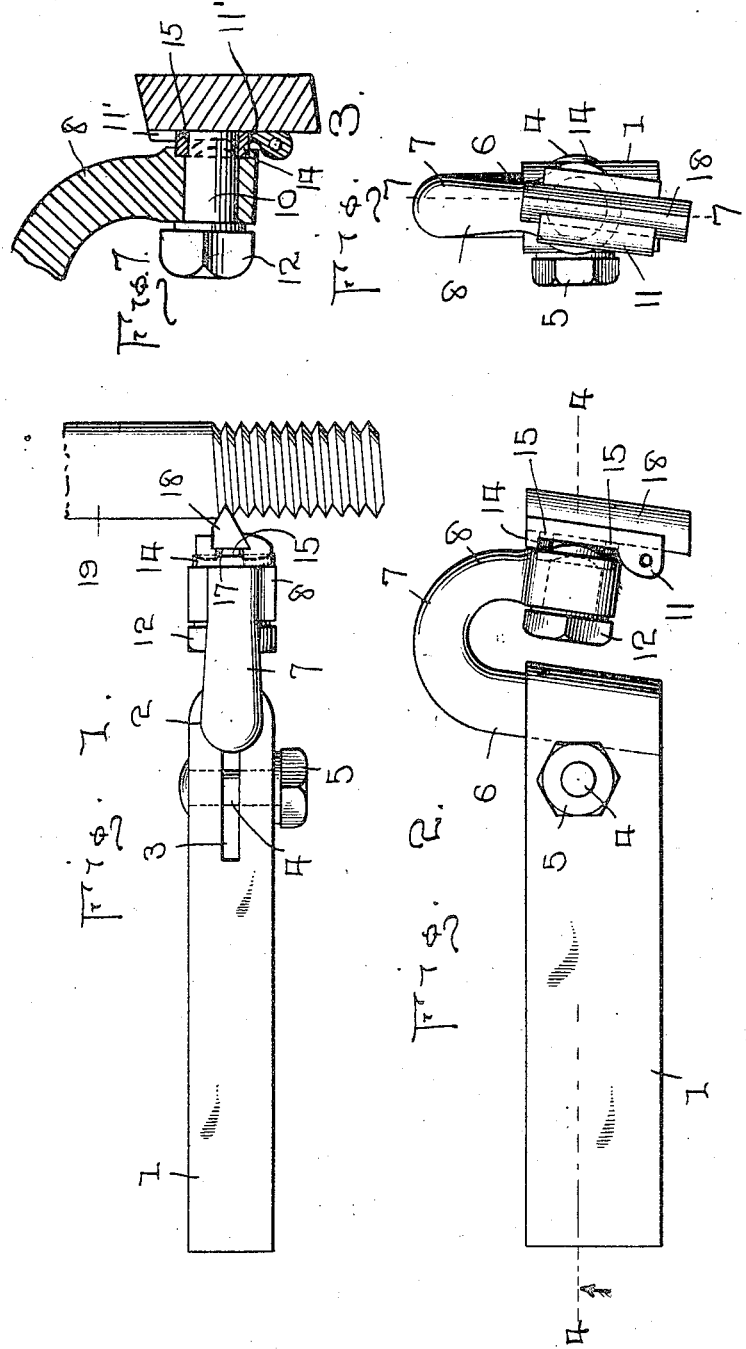
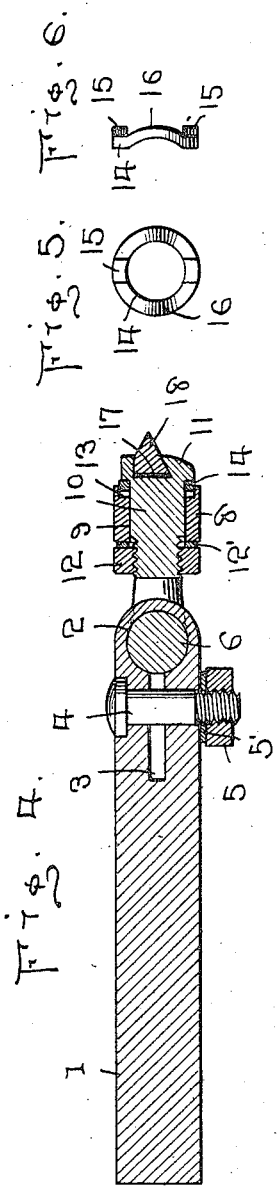
WITNESSES:
Thos. W. Riley
M. Newcomb
INVENTOR
D. Howard
BY W. T. Fitzgerald & Co.
Attorneys

UNITED STATES PATENT OFFICE.

DANIEL HOWARD, OF KENOSHA, WISCONSIN.

TOOL-HOLDER.

1,060,340.

Specification of Letters Patent. Patented Apr. 29, 1913.

Application filed April 19, 1912. Serial No. 691,876.

*To all whom it may concern:*

Be it known that I, DANIEL HOWARD, a subject of the King of England, residing at Kenosha, in the county of Kenosha and State of Wisconsin, have invented certain new and useful Improvements in Tool-Holders; and I do hereby declare the following to be a full, clear, and exact description of the invention, such as will enable others skilled in the art to which it appertains to make and use the same.

This invention relates to tool holders and more particularly to tool holders adapted to hold tools such as thread cutters.

An object of the invention is to provide a tool holder which may be adjusted at any angle to properly position the cutter and which will resiliently retain the tool in proper engagement with the work.

Another object is to provide a tool holder of this character which may be readily connected to the tool holder post of an ordinary lathe which will properly serve to hold various cutting tools in proper engagement against the work and at the proper angle in relation to the work.

Other objects and advantages will be hereinafter more clearly set forth in the specification and claims.

In the accompanying drawings which form a part of this application, Figure 1 is a top plan view of the device, showing the cutting tool carried thereby engaged against a rod for cutting threads thereon. Fig. 2 is a side elevational view of the holder with the tool carried thereby. Fig. 3 is a front elevational view, at right angles to Fig. 2. Fig. 4 is a cross sectional view on line 4—4 of Fig. 2. Fig. 5 is a plan view of the spring washer for the tool. Fig. 6 is a side view of the same, and, Fig. 7 is a sectional view taken on the line 7—7 of Fig. 3.

Referring more particularly to the drawings in which similar reference characters designate corresponding parts throughout the several views, 1 represents the shank which is adapted to be secured in the tool holder post in the usual manner. The shank 1, however, is provided in its forward end with a vertically extending circular opening 2 and with a longitudinal slot 3 extending rearwardly therefrom, said slot 3 being continued from the upper to the lower ends of the shank. A bolt 4 is passed transversely through the shank 1 at its slotted portion. The sides of the shank 1 may be drawn toward one another by tightening the nut 5 and the bolt 4. The purpose of drawing the sides of the shank 1 toward one another is to tighten the same around the long depending leg 6 of the adjustable U-shaped member 7, said long depending leg 6 being positioned in the circular opening 2 in the forward end of the shank 1.

The end of the short depending leg 8 of the U-shaped member 7 is enlarged and provided with a circular opening therethrough, as shown at 9 to receive therethrough the stem 10 of the blade holder 11, it being understood that the blade holder 11 is positioned upon the forward end of the stem 10 while the rear end of the stem is threaded to receive the nut 12 between the legs 6 and 8. It will be understood that suitable washers 5' and 12' are placed beneath the nuts 5 and 12 respectively.

The leg 8 of the member 7 is provided with a seat 13 at the forward end of the opening 9 to accommodate the spring washer 14, against which washer 14 bears the blade holder 11. The spring washer 14 is provided at diametrically opposite points with flat lugs 15 upon one face. This face of the washer is slightly bulged upwardly between the lugs 15, as shown at 16 by being pressed upwardly from the opposite side.

The blade holder 11 is provided with a dove-tailed groove, as shown at 17 to receive and properly hold the blade 18. The blade holder 11 is extended in opposite directions from the stem 10 and provided with suitable openings 11' through which the lugs 15 may project to engage the back of the blade 18. It will thus be seen that upon tightening of the nut 12 upon the stem 10, the spring washer 14 will be pressed tightly against its seat 13, flattening the spring washer and forcing the lugs 15 carried thereby through the openings provided for said lugs and causing the lugs to press tightly against the back of the blade 18 and prevent movement of the latter in the dove-tailed groove 17, the lugs 15 also serving to lock the washer 14 against rotation independently of the stem 10 and blade holder 11.

In Fig. 1 the device is shown with the blade 18 engaged against a rod 19 upon which rod the blade has cut threads for some distance from one end. It will be clearly seen, however, that the stem 10 may be rotated in the circular opening 9 in the end of the short leg 8 of the member 7, after loosening the nut 12 to place the cutting blade 18 in proper position to give the desired slant to the groove being cut or to vary the number of threads to the inch when the blade 18 is used for cutting threads. The adjustable U-shaped member 7 may be readily swung to various positions or raised or lowered as desired and held in proper position by tightening the nut 5 upon the bolt 4, to retain the blade 18 at the proper angle to the work.

It will thus be seen that I have provided a tool holder which is adapted to hold a tool such as a cutting blade in proper position against the work. It will further be apparent that as this tool holder has a double adjustment, the tool carried thereby may be adjusted to any suitable angle to properly perform its duties. Further, owing to the construction of the spring washer 14, the blade 18 will be securely but resiliently held in engagement with the work, as will be clearly apparent to those familiar with devices of this character.

What I claim is:

1. A tool holder comprising a shank, a U-shaped member having a leg thereof adjustably secured in said shank and having the other leg apertured, a blade holder having a threaded stem extending therefrom mounted in said apertured leg, a nut threaded on said stem, and a lugged washer carried by said stem and disposed between said blade holder and said apertured leg, the lugs of said washer being adapted to engage and lock a blade in the blade holder.

2. A tool holder comprising a U-shaped member having one leg thereof provided with an opening, a blade holder having a stem adjustably secured within the opening, a blade in said holder, and a spring washer disposed on said stem between said U-shaped member and blade holder, said washer being bulged at diametrically opposite points and provided with lugs at points between said bulged portion adapted to engage and lock said blade within the holder simultaneously with the securing of said blade holder upon said U-shaped member.

In testimony whereof I have signed my name to this specification in the presence of two subscribing witnesses.

DANIEL HOWARD.

Witnesses:
BELLE B. FRANTZ,
LAURA BAIN.